United States Patent
Weidman et al.

(10) Patent No.: US 10,127,575 B1
(45) Date of Patent: Nov. 13, 2018

(54) SYSTEMS AND METHODS FOR DETERMINING IMPACT OF HIGH-AFFINITY BASKETS

(71) Applicant: Applied Predictive Technologies, Inc., Arlington, VA (US)

(72) Inventors: William V. Weidman, Arlington, VA (US); Jarred D. Brown, Arlington, VA (US); Evan L. Newkirk, Arlington, VA (US); Eve D. Hanson, Washington, DC (US); Guillaume Vanderschueren, Washington, DC (US)

(73) Assignee: Applied Predictive Technologies, Inc., Arlington, VA (US)

( * ) Notice: Subject to any disclaimer, the term of this patent is extended or adjusted under 35 U.S.C. 154(b) by 375 days.

(21) Appl. No.: 13/945,434

(22) Filed: Jul. 18, 2013

(51) Int. Cl.
*G06Q 30/02* (2012.01)
(52) U.S. Cl.
CPC ................. *G06Q 30/0246* (2013.01)
(58) Field of Classification Search
CPC ............ G06Q 30/00; G06Q 30/0242; G06Q 30/0241; G06Q 30/0207; G06Q 30/0276

USPC .................................................. 705/14.68, 28
See application file for complete search history.

(56) References Cited

U.S. PATENT DOCUMENTS

| | | | |
|---|---|---|---|
| 7,092,929 B1 * | 8/2006 | Dvorak et al. | 705/28 |
| 2004/0103018 A1 * | 5/2004 | Kim et al. | 705/10 |
| 2005/0273376 A1 * | 12/2005 | Ouimet et al. | 705/10 |

* cited by examiner

*Primary Examiner* — Marilyn G Macasiano
(74) *Attorney, Agent, or Firm* — Eric L. Sophir; Dentons US LLP

(57) ABSTRACT

The systems and methods described herein attempt to capture the impact on both the promoted items and other related products. The systems and methods analyze attached sales impact only for items that are more likely to be purchased with the featured product. The systems and methods also allow for measuring a cannibalization impact by analyzing the impact on potential cannibalized products and items that are more likely to be purchased with the cannibalized products. By aggregating the promoted impact and cannibalized impact, including the items with strong co-selling relationships, a full picture of the promotion can be obtained. Further, combining the item-level results into custom groupings can allow for further business insights.

19 Claims, 8 Drawing Sheets

SYSTEMS AND METHODS FOR DETERMINING IMPACT OF HIGH-AFFINITY BASKETS

FIELD OF THE INVENTION

This invention relates generally to systems and methods for identifying an impact of a promoted item.

BACKGROUND

As the availability and quality of business data has increased over the past several decades, so too has the ability of businesses to assess the impact of new ideas. Use of increasingly powerful computer systems and software packages has enabled businesses to understand how new initiatives have changed key performance indicators. Much as the technological component of program evaluation has evolved, so too has the business paradigm around how to best determine the value of an idea. Businesses that were initially focused on experience and intuition moved to rudimentary reporting and tracking, then more simplistic pre versus post statistical analysis, and many have finally adopted a more rigorous pre versus post, test versus control approach that leverages the scientific method. Though this technique is a reliable and accurate method for determining the incremental impact of a new program, there are instances where it does not capture the full value of an action.

At their core, consumer facing initiatives are designed to change consumer behavior in a manner that is profitable to the retailer or business over time. Though the effect of something like a price change or new product introduction may be immediately measurable, particularly in a test versus control atmosphere, there may be secondary effects on consumer behavior that are not as easily assessed. In particular, it can be difficult to measure the impact of a promotion on a consumer's purchases beyond those items or services that are directly promoted.

For example, consider a program that places items on promotional display throughout physical retail locations. A customer walking through the store may add a featured item to his or her basket based on the fact that the product is featured more prominently than before. Businesses today are very familiar with this scenario; because they can identify which items are promoted, they can measure the impact of the program on those items. However, suppose that the presence of the promoted item now caused the customer to add several more items to their purchase that were not on promotion. Businesses are much less adept at determining the impact of the program in this instance and have traditionally relied on three strategies to do so: (1) ignore the impact on the rest of the purchase and focus solely on promoted items; (2) measure the impact for the entire store; and (3) include the benefit of all other items bought in the same trip along with a featured item. However, all three of these techniques have inherent flaws. An example of a grocery store putting chips on an aisle endcap promotion can be used to highlight these flaws.

In a first strategy option, the grocery store may ignore the impact on the rest of the purchase and focus solely on promoted items. This method potentially undervalues the initiative. In this example, the grocery store only counts the sales of incremental chips sales or transactions. However, having chips on promotion will probably increase salsa sales as well. By not measuring salsa sales, the grocery store is not capturing the full value of the promotion.

In a second strategy option, the grocery store may measure the impact for the entire store. This method generally includes too much noise from all of the other products in the grocery store, so the signal of the initiative is lost. If the grocery store tries to read the impact of the chips promotion at the total grocery store level, too many other actions will be happening in the grocery store and we will not be able to measure the incremental difference.

In a third strategy option, the grocery store may include the impact of the entire basket in analysis of the program. This method potentially overvalues the initiative. In this example, this would translate to attributing all incremental sales of baskets containing chips to the chips promotion. However, this does not conform to business logic. If customers had previously not purchased chips, and now add chips to the items they were previously planning to purchase, the entire basket sales would now be attributed to the chips promotion. This almost certainly does not reflect the actual consumer behavior. The chip display likely did not cause the consumer to buy everything in his or her basket. For example, purchase of products without strong co-selling relationships with chips, such as cleaning products or fresh fruit, are unlikely to have been spurred by the chip display. Thus, using this methodology overvalues the promotion.

All three approaches also share the additional flaw of not accounting for cannibalization or substitution effects. Referring to the chip example, the customer may have walked in the door planning to purchase crackers. The promotional display encouraged the customer to switch to chips, but the crackers were no longer purchased. To assess the true impact of the promotion, the negative impact of crackers must be accounted for. Moreover, the customer may have planned to purchase cheese along with the crackers but instead now buys salsa along with chips. Both cheese and crackers have been negatively impacted.

Because of these inherent flaws, there is a clear need for a more intelligent method to determine which non-promoted items may be affected by a program in order to properly determine the full value of the business idea.

SUMMARY

The methods and systems described herein attempt to address the shortcomings of conventional approaches by providing an algorithm and software capability to accurately assess the incremental impact of a promotion. This is achieved by aggregating the impact on promoted items and the high-affinity attached sales and cannibalized items and high-affinity attached sales.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

In one embodiment, a computer-implemented method for determining an impact of a promotion, the method comprises measuring, by a computer, an impact of a promoted item; identifying, by the computer, at least one item with high-affinity to the promoted item; measuring, by the computer, an impact of the at least one high affinity item in at least one basket of the promoted item; and aggregating, by the computer, the impact of the promoted item with the impact of the at least one high affinity item to determine a total impact of the promotion.

In another embodiment, a system for determining an impact of a promotion comprises a processor configured to measure an impact of a promoted item; identify at least one item with high-affinity to the promoted item; measure an impact of the at least one high affinity item in at least one basket of the promoted item; identify at least one cannibalized item based upon the promoted item; measure an impact of the at least one cannibalized item in at least one basket of the promoted item; identify at least one item with high-affinity to the at least one cannibalized item; measure the impact of the at least one item with high-affinity to the at least one cannibalized item in at least one basket of the cannibalized item; and aggregate the impact of the promoted item, the impact of the at least one high affinity item, the impact of the at least one cannibalized item, and the impact of the at least one item with high-affinity to the at least one cannibalized item to determine a total impact of the promotion.

In yet another embodiment, a computer-implemented method for determining an impact of a promotion, the method comprises an identification, by a computer, from a set of transactions within a time period a subset of the set of transactions where the transaction included a promoted item; calculating, by the computer, an impact of the promoted item in the subset of the set of transactions; identifying, by the computer, at least one item of the plurality of items that has an affinity above a threshold amount to the promoted item; calculating, by the computer, an impact of the at least one item having an affinity to the promoted item above a threshold amount in the subset of the set of transactions; and calculating, by the computer, a total impact based upon the impact of the promoted item and the impact of the at least one item having an affinity to the promoted item above a threshold amount in the subset of the set of transactions.

It is to be understood that both the foregoing general description and the following detailed description are exemplary and explanatory and are intended to provide further explanation of the invention as claimed.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
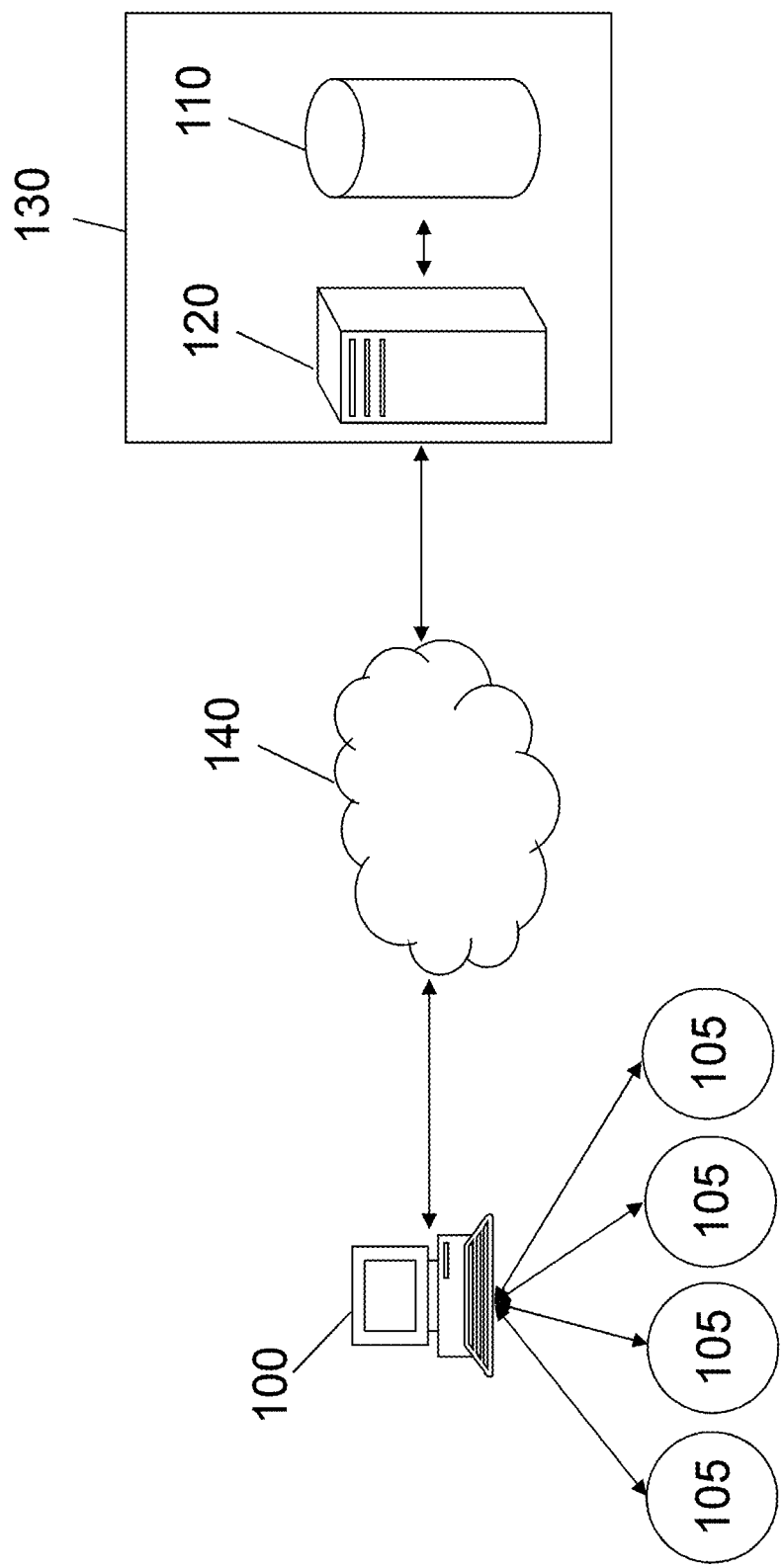
FIG. 1 shows a system overview according to an exemplary embodiment.

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present invention.

Many business initiatives may only impact a part of a store that represents a smaller percentage of that store's sales. However, the impact of a business initiative to other products not specifically featured can drive the economics of the program. For example, when a customer is prompted to buy a featured item, the customer may also buy other items in the same trip or not buy a substitute product that the customer was otherwise planning to buy. Measuring the impact of across the entire store includes too much noise, and the signal of the business initiative can be lost. Measuring the impact on only the featured items and everything else in the customers' baskets can overstate the impact of the program. For example, a customer buys $100 of merchandise and, at the checkout aisle, throws an item into the basket that happened to be in the weekly circular. The initial $100 in sales was not driven by the circular. The systems and methods described herein attempt to capture the impact on both the promoted items and other related products. The systems and methods analyze attached sales impact only for items that are more likely to be purchased with the featured product. The systems and methods also allow for measuring a cannibalization impact by analyzing the impact on potential cannibalized products and items that are more likely to be purchased with the cannibalized products. By aggregating the promoted impact and cannibalized impact, including the items with strong co-selling relationships, a full picture of the promotion can be obtained. Further, combining the item-level results into custom groupings can allow for further business insights.

As described herein, a customer shopping in at a store or other location may purchase a plurality of items or products together. An item can include any product, service, voucher, or gift card that can be purchased, and the terms "item" and "product" may be used interchangeably herein. The collection of these items or products is referred to herein as a "basket," even though the customer may not physically place each of these items in a physical basket. Each customer purchases a basket of one or more items at the store or location. The systems and methods described herein analyze those baskets that contain a featured or promoted item or product. When analyzing the baskets, the systems and methods consider certain sales within the same basket as the featured or promoted item or product. The systems and methods analyze the items and products in those baskets rather than the total of all items of each basket having the featured or promoted item or product. As a result, not all attached sales may be relevant to the analysis.

Referring to FIG. 1, an exemplary system diagram is shown. A client has a business network comprised of various entities 105, which may be business locations, stores, sites, students, accounts, customers, products, services, regions, patients, or other types of entities. In the exemplary embodiment, the entities represent a physical place where a company conducts business, such as a bank branch, a retail store, or a restaurant, though it is intended that the location can be any one of multiple places or sites that a company can conduct business. Further, although the exemplary embodiment often refers to the entity as a "location," it is intended that any type of entity can be used. The entities 105 may provide similar products and/or services to customers. In some embodiments, the entities 105 may be geographically dispersed.

A client computer 100 can represent one or more computers of the client, who may manage the various entities 105 or track data regarding the entities 105. In one example, for a consumer business, the client can be an organization headquarters or a marketing division for one or more entities 105 (e.g., a grocery store chain that determines which products and/or services each retailer location should provide). In some embodiments, each entity 105 can have its own client and computer 100. In other embodiment, a client and the computer 100 can be used for multiple entities 105. One or more users (not shown) may operate the computer 100. The computer 100 can be a desktop computer, workstation, laptop, personal data assistant, tablet computer, mobile phone, or any other similar computing system operated by a user. The computer 100 may use its processor to execute browser software stored in memory that enables a user to request, receive, and render information from a network 140.

The network 140 may be a shared, public, or private network and may encompass a wide area or a local area. The network 140 may be implemented through any suitable combination of wired and/or wireless communication networks. For example, network 140 may be implemented through a wide area network (WAN), local area network (LAN), an intranet, and/or the Internet. Further, network 140 may represent multiple networks, such as a wireless carrier network connected to the Internet.

The computer 100 transmits or otherwise provides historical data regarding entities 105 to a host entity 130. In this exemplary configuration, the host entity has a server 120 is coupled to the database 110, though the server 120 and the database 110 can be combined into a single device or each comprise multiple devices. The server 120 can be a computer system such as a database server machine, a desktop computer, workstation, or any other similar server side computing system that performs one or more service-side processes. The server 120 can have an interface unit for communicating information to and from the client's computer 100 over the network 140. In some embodiments, the server 120 may communicate with another server, such as a web server, that can more directly communicate over the network 140. The server 120 can use its processor to execute a computer program stored in memory that can access and analyze the data stored in the database 110.

The database 110 can comprise one or more memory devices that store data and/or executable software that is used by the server 120 to perform processes consistent with certain aspects described herein. The database 110 may be located external to server 120 and accessible through the network 140 or other network, such as a dedicated back-end communication path. In one embodiment, the database 110 can be located at the client or another location, such as with server 120. The database 110 can be populated with records about the client's historical data for various locations, sales, promotions, pricing, personnel, and the like. The client computer 100 can communicate with the server 120 to request analysis and view results.

In one embodiment, the client uses computer 100 to communicate over the Internet 140 with the host entity's server 120. The computer 100 may use a thin client, such as a web browser, which accesses a website hosted by the host entity 130. The client may be prompted to enter a username and password into the web browser on the computer 100.

The client can be authenticated to access data and perform analysis of that data. Alternatively, the client may request that another entity, such as the host entity 130 perform the analysis of their business initiative. The systems and methods described herein can be implemented as a computer program product embodied on a computer readable medium of computer 100 or server 120, and one or more steps of the process can be implemented as a module of the computer program product.

In order to analyze a business initiative, inputs may be entered on a graphical user interface at the client computer 100 or host server 120. These inputs can assist in defining the algorithm or limit the scope of the calculations. The inputs can be entered manually on the graphical user interface and/or automatically selected and entered. In one example, a user may input an identity of stores executing a promotion, promoted items, and a timeframe for the promotion.

Figure 2:
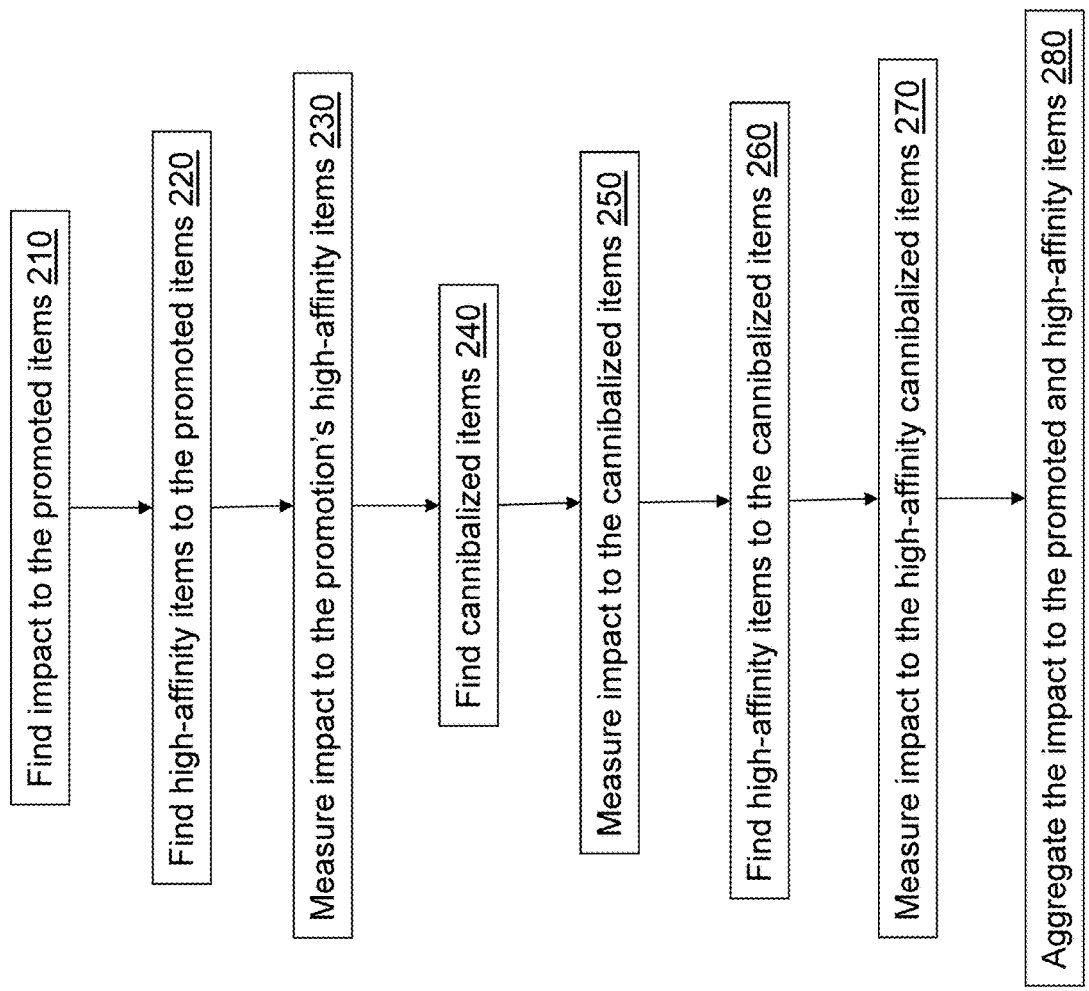
FIG. 2 shows a flowchart of an algorithm according to an exemplary embodiment.

An algorithm (or a set of algorithms), which is (or are) embodied in a computer-readable medium and executed by a processor of computer 100 or server 120, can assess the incremental impact of a promotion. Referring to FIG. 2, in step 210, the algorithm can find the impact to the promoted items. In step 220, the algorithm can find high-affinity items to the promoted items. In step 230, the algorithm can measure the impact to the promotion's high-affinity items. In step 240, the algorithm can find the cannibalized items. In step 250, the algorithm can measure the impact to the cannibalized items. In step 260, the algorithm can find the high-affinity items to the cannibalized items. In step 270, the algorithm can measure the impact to the high-affinity cannibalized items. In step 280, the algorithm can aggregate the impact to the promoted and high-affinity items.

In step 210, the algorithm can find the impact to the promoted items. The algorithm can identify the incremental sales impact on the item or items that have been promoted or featured. A calculation of the incremental sales impact can be performed using test versus control approaches (e.g., comparing the test store to the rest of the chain or rest of the region) to isolate the incremental impact, but other less robust measures can be used as well, such as comparing sales to a prior year. Sales impact can be measured in an actual dollar amount.

As a first output, the algorithm calculates lift and impact for the promoted items (e.g., using test versus control analysis) during a relevant timeframe in relevant stores. Only transactions that include at least one promoted item are considered.

In step 220, the algorithm can find high-affinity items to the promoted items. "Affinity" measures the co-selling relationship between two items. Affinity can be comprised of two metrics: frequency and attach rate. Frequency is a percentage of all purchases that contain Product A. Attach rate is a percentage of purchases containing Product B that also contain Product A. Affinity can be comprised of the ratio of these two metrics: Attach Rate/Frequency.

In other words, Product A has a high affinity to Product B if it is purchased more frequently with Product B than in normal transactions. If an item is put on an in-store promotion, such as on an endcap, it is not reasonable to attribute a value of a user's entire transaction (e.g., all of the items in the user's shopping cart or "basket") to the promotion. However, attributing the sales of high affinity products may comply with business logic.

In an example, if chips are put on an endcap display in a grocery store, it does not conform to business logic to attribute fruit sales in the same basket to the chips promotion. However, salsa has a high-affinity relationship to chips. Attributing incremental sales of salsa in chips transactions to the chips endcap promotion captures a fuller and more accurate picture of the benefit of the chips endcap promotion.

The algorithm automatically identifies high affinity items to any other item. Furthermore, the algorithm allows for an analyst to set parameters related to how high affinity items are identified, including: (1) a filter of the frequency of purchase of items; (2) a filter of the attach rate between two items; (3) a filter of how strong the affinity must be for other items to be identified as high affinity to any particular item; (4) a filter that restricts its search for high affinity items to items falling within user defined price ranges, which allows the analyst to avoid attributing very expensive item sales to a lower price featured item (e.g., a hardware store may exclude sales of a refrigerator when considering light bulb sales, a grocery store may exclude sales of wine when considering milk sales); and (5) a filter that requires that high affinity items meet a certain sales or velocity threshold so that items that normally are sold very infrequently are filtered out of the identification process (e.g., a hardware store may exclude infrequent sales of refrigerators, a grocery store may exclude infrequent sales of truffles).

Figure 3:
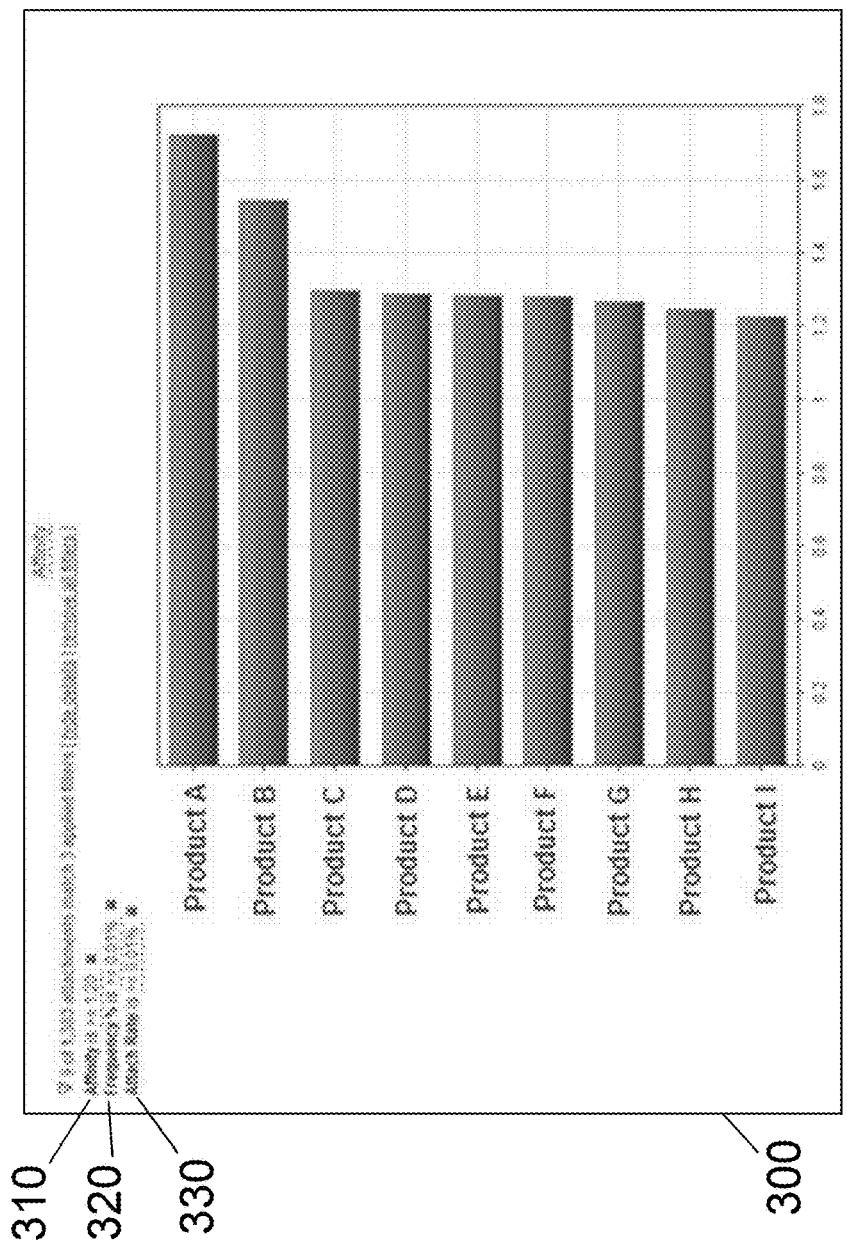
FIG. 3 shows a graphical user interface illustrating high affinity products according to an exemplary embodiment.

Referring to FIG. 3, a graphical user interface 300 implementing the algorithm is shown. An analyst can enter parameters or the system may use default settings for three filters. In this exemplary embodiment, an affinity filter 310 is set to greater than or equal to 1.20, a frequency filter 320 is set to greater than or equal to 0.01%, and an attach rate filter 330 is set to greater than or equal to 0.01%. In this particular example, a particular category of products has been selected, and the algorithm has identified nine products (Product A through Product I) out of a set of 1,383 products that have an affinity to the category of products meeting the thresholds of the filters.

The high-affinity items can then be aggregated. In one embodiment, these items can be grouped together in a single category for further analysis. The graphical user interface 300 can allow an analysis to select these items to create a custom category based on their high affinity to a particular category of products or particular product.

In step 230, the algorithm can measure the impact to the promotion's high-affinity items. The algorithm measures the impact in sales or other key metrics of the group of items identified as high-affinity items in step 220 during the promotion or activity being measured. Similar to the calculation in step 210, a test versus control method of measurement can be used to calculate impact, but other approaches may be used as well. The algorithm can measure impact and lift (percentage change) of these high affinity products that are included in the same basket as the promoted item. As one alternative, rather than analyzing the group of high affinity products, each high affinity product can be separately analyzed to determine the impact on that product based on its appearance in baskets with the promoted item. The algorithm focuses on the high-affinity items rather than all items in the basket, some of which may be unrelated to the purchase of the promoted item.

As a second output, the algorithm calculates lift and impact for the high-affinity items in promoted items baskets (e.g., using test versus control analysis) during the relevant timeframe in relevant stores. Only transactions that include at least one promoted item are considered.

Figure 4:
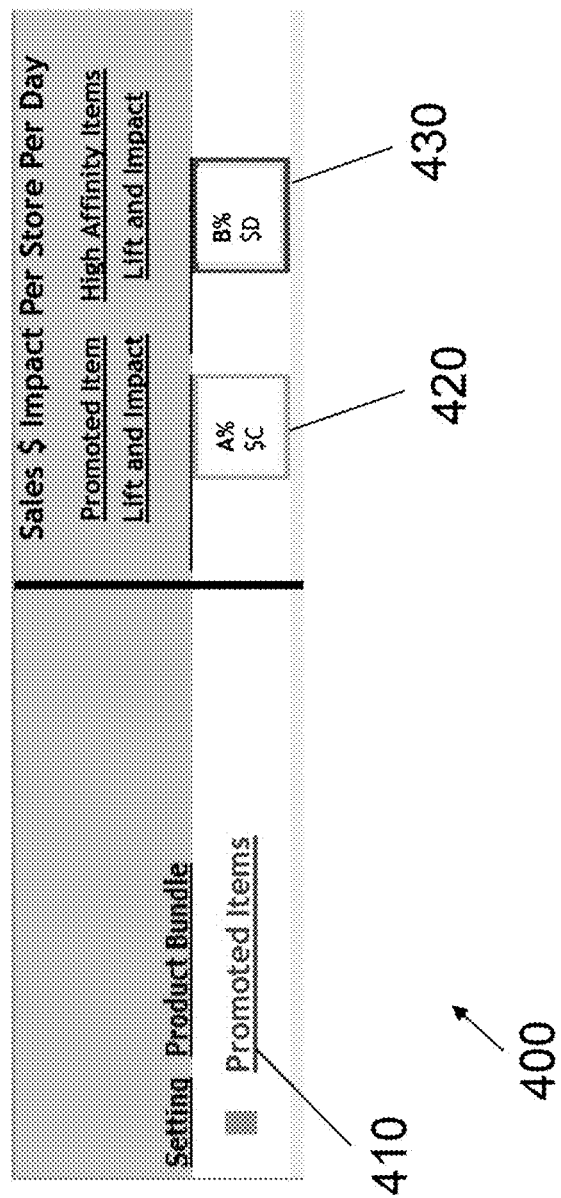
FIG. 4 shows a graphical user interface illustrating lift and impact according to an exemplary embodiment.

Referring to FIG. 4, a graphical user interface 400 implementing the algorithm is shown. For promoted items 410, the graphical user interface 400 can present a calculated lift and impact of a promoted item 420. As shown in this exemplary embodiment, the lift is calculated as A %, and the impact has been calculated as $C. The graphical user interface 400 can present a calculated lift and impact of high affinity items 430. As shown in this exemplary embodiment, the lift is calculated as B %, and the impact has been calculated as $D.

In step 240, the algorithm can find the cannibalized items. To capture the full economics of the promotion, it is useful to understand the impact not only on the promoted items, but also of the items that are cannibalized by the promotion. In order to identify the items that are most likely to be cannibalized, the algorithm finds items that are most similar to the promoted items. Finding these items can be performed in various ways. In one method, this is performed by aggregating all other items that have the same parent category in the product hierarchy as the promoted items. For example, if the promoted item is skim milk, then other types of milk may be classified as cannibalized items. In another method, the algorithm identifies other items that are very low affinity to the featured item. In yet another method, the algorithm identifies only a subset of products that are in the same parent category that have high affinity to a similar set of other items as the featured item. For example, if the promoted item is chips that have a high affinity to salsa, then other chips that have a high affinity to salsa may be classified as cannibalized items.

In step 250, the algorithm can measure the impact to the cannibalized items. The impact to the cannibalized items identified in step 240 can be measured similarly to the impact measurement described above with respect to step 230.

As a third output, the algorithm calculates lift and impact for the cannibalized items (e.g., using test versus control analysis) during the relevant timeframe in relevant stores. Only transactions that include at least one cannibalized item are considered.

In step 260, the algorithm can find the high-affinity items to the cannibalized items. To more fully capture the positive benefit of the promotion, the algorithm can calculate the impact on both the promoted item and high-affinity items. To have a consistent and equitable approach for cannibalized items, the algorithm can also attribute the high-affinity items associated with any cannibalized items identified in step 240. For example, if a grocery store promotes Coke, the sales of Pepsi will likely be cannibalized. Just as the algorithm measures the benefit of additional high affinity items being added in the basket for customers buying Coke, the algorithm measures the negative impact of losing not just Pepsi sales (as described in step 250), but also the loss of high affinity items that would have gone in those Pepsi baskets. The algorithm identifies which other items are high affinity for each item identified as cannibalized in step 240. The algorithm can use the same methodology described in step 220 to find the high-affinity items to the cannibalized items, except that the base category set is now comprised of the potential cannibalized items identified in step 240.

In step 270, the algorithm can measure the impact to the high-affinity cannibalized items. The algorithm measure the incremental impact on the items identified in step 260 that are high affinity to each cannibalized product. The algorithm can use the same methodology described above for measuring impact.

As a fourth output, the algorithm can calculate lift and impact for the high-affinity items in cannibalized items baskets (e.g., using test versus control analysis) during the relevant timeframe in relevant stores. Only transactions that include at least one cannibalized item are considered.

Figure 5:
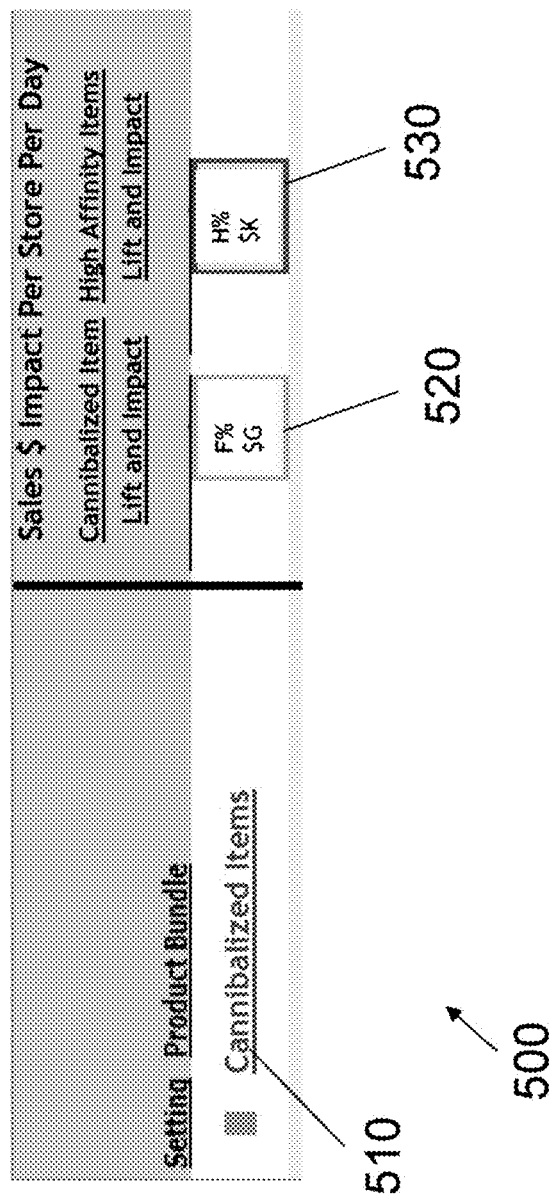
FIG. 5 shows a graphical user interface illustrating lift and impact according to an exemplary embodiment.

Referring to FIG. 5, a graphical user interface 500 implementing the algorithm is shown. For cannibalized items 510, the graphical user interface 500 can present a calculated lift and impact of a cannibalized item 520. As shown in this exemplary embodiment, the lift is calculated as 11%, and the impact has been calculated as $X. The graphical user interface 500 can present a calculated lift and impact of high affinity items 530. As shown in this exemplary embodiment, the lift is calculated as 20%, and the impact has been calculated as $Y.

In step 280, the algorithm can aggregate the impact to the promoted and high-affinity items. The full promotion lift and impact can be calculated by aggregating the promoted, promoted-high affinity, cannibalized, and cannibalized-high affinity lifts and impacts. The aggregate impact from featuring or promoting an item is calculated by:

$$\text{Aggregate impact} = \text{Impact}_{promoted} + \text{Impact}_{affinity} - \text{Impact}_{cannibalized} - \text{Impact}_{affinitycannibalized}$$

In other words, aggregate impact from featuring or promoting an item equals impact on the item promoted plus impact on the high affinity items to the promoted item minus impact on the items cannibalized by the promoted item minus impact on the items that are high affinity to the items cannibalized. This aggregated impact analyzes only those baskets that are sold with the promoted or featured items.

The system calculates and outputs the aggregated impact, which can be displayed on a graphical user interface. By using these four inputs (impact on the item promoted, impact on the high affinity items to the promoted item, impact on the items cannibalized by the promoted item, and impact on the items that are high affinity to the items cannibalized), the system can better assess the impact of a promoted or featured item. The system automatically classifies items in those baskets that have the promoted or featured item to calculate the impact. In one embodiment, the algorithm calculates impact based upon the promoted item and the products with high affinity to the promoted item, but does not consider the impact of cannibalized items or items with high affinity to the cannibalized items. In another embodiment, the algorithm calculates impact based upon the promoted item, products with high affinity to the promoted item, cannibalized items, and items with high affinity to the cannibalized items. Conventional attempts may use business intuition to look at chips and salsa together, but the conventional attempts cannot identify which affinity items to use and do not focus on the basket of the promoted or featured item.

The algorithm can be used to assess a promotion's full impact for a particular item on promotion. Further business insights can be gleaned by aggregating items together into custom groupings based on the business context. The algorithm supports this aggregated view.

These custom groupings can be based on specific information about the promotion and/or the items on promotion. The items can be combined based on: promotion type, promotion timeframe, price point, product type, product volume before the promotion, product transaction frequency before the promotion, indicators of seasonality, product brand, product size, and other key characteristics.

Based on these aggregated results, a "profile of success" for a particular type of promotion can be created. In an example, using an in-store endcap promotion, by looking across a series of end cap promotions, one can use these aggregated results to identify what types of products or offers work best on that endcap. The aggregated results may suggest that lower price, small, and highly seasonal products perform best on the endcap, after incorporating both the promoted and cannibalized items and their high affinity attached items.

The system can assess success of various promotions to assist in determining future advertising placements and promotions. For example, a grocery store may promote 100 items each week. The grocery store may promote a soft drink as well as a brand of chips. In addition to the lift from just the soft drink sales based on the promotion, it is useful to understand the benefits across all of the promotions rather than each single item at a time. As a result, the grocery store may better determine which item to promote on a front page of a circular.

Each promotion may have a different impact. During a given week, a grocery store may have 30 different items on their endcaps throughout the store. In some instances, each promotion may run for two weeks on an endcap. The system can store the dates, promoted items, and identity of the endcap used in the promotion. Also, for each item, the system can store information about whether the item is private label or branded, the size, price, whether the item is for a holiday or seasonal, and any other information. The system can also categorize items by price ranges (e.g., items under $5 and items under $25). For each endcap, the system can store information regarding the store, the location, and any other information. For each promotion, the system can store information about the type of promotion, e.g., 20% off or buy one and get one for free. Using the data collected about the various attributes of the promoted items and the endcaps, the system can assess the impact of placing a particular item on page one of a circular. The system can also assess which attributes are shared between those promotions with the biggest benefit. The system can compare different types of endcaps, such as those with low value products or those with seasonal products. The system can also assess whether featuring high-priced items may result in more items being placed in the basket. A user can input one or more criteria regarding these various attributes in computer 100 or server 120, which will calculate a profile of success based upon the received criteria.

In one example, the system can analyze endcap promotions across 500 stores and consider relevant items only when they were promoted on an endcap. In conducting the analysis, the system considers a pre-period time frame and a post-period time frame. For example, the pre-period time frame may be 365 days and end one day before the launch of a promotion, and the post-period may be from the launch to the end, which may be the same as a test period. The analysis may implement any known strategy for identifying a control group. The system can also remove outliers to identify the data from the test lift and control lift with the most significance. In this exemplary embodiment, control stores can be selected by matching financial performance for featured items, overall financial performance, and geography. As a result, the test and control stores can be well-matched leading into the test period. The system can then identify an increase in sales for placement of a featured item on an endcap, e.g., a featured item had a 10% increase ($300 per store per day) in sales for a featured item. The system can identify high affinity products of the attached sales that can be attributed to endcap placement, as shown in FIG. 3. For each endcap type, products with affinities over a certain threshold (e.g., 1.2) are selected as likely attached items. The system can then assess the impact of the endcaps on items regularly purchased with those on the endcap. For example, the system may determine that the high affinity products have a 20% lift based on the promoted endcap items, as shown in FIG. 4. When accounting for the impact of the basket, the system can calculate a value for the endcap program based upon the impacts for the various endcaps and high affinity products.

The system can identify which endcaps were most effective in driving the promoted item and impacting the rest of basket sales. Endcaps can be assessed by key selling characteristics to determine which types of items were most successful. Examples of item characteristics include, but are not limited to: (a) price point: the price of the featured item; (b) purchase frequency: how often the item is purchased per store per week; (c) sales index: measure of how much an item sells in the season as compared to the entire year; and (d) percent of transactions purchased alone: percent of transactions in the pre-period that were purchased with the item alone. In one example, the system may determine that the most successful items were moderately priced, frequently sold, and rarely purchased alone.

Figure 6:
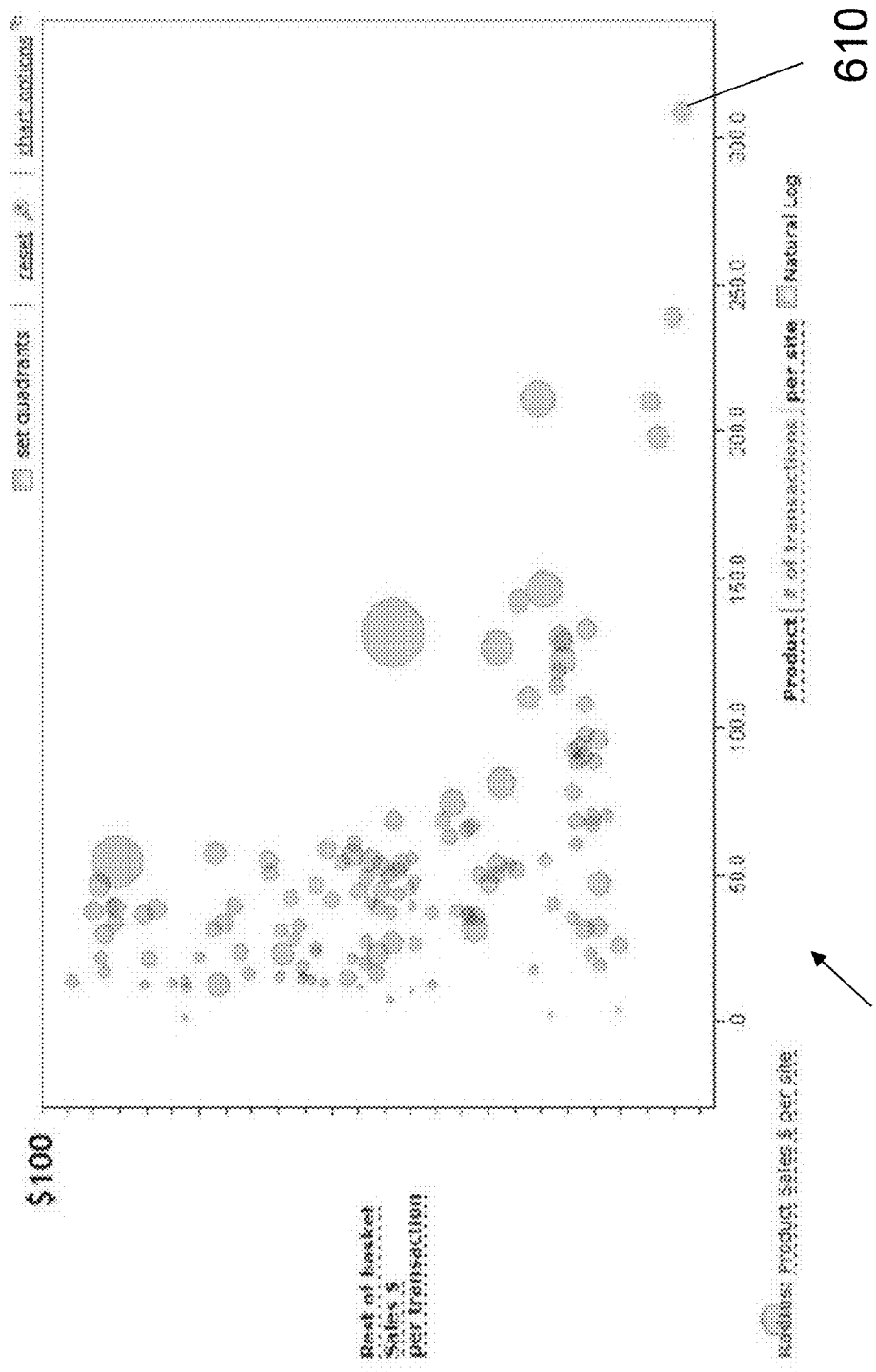
FIG. 6 shows a chart on a graphical user interface according to an exemplary embodiment.
Figure 7:
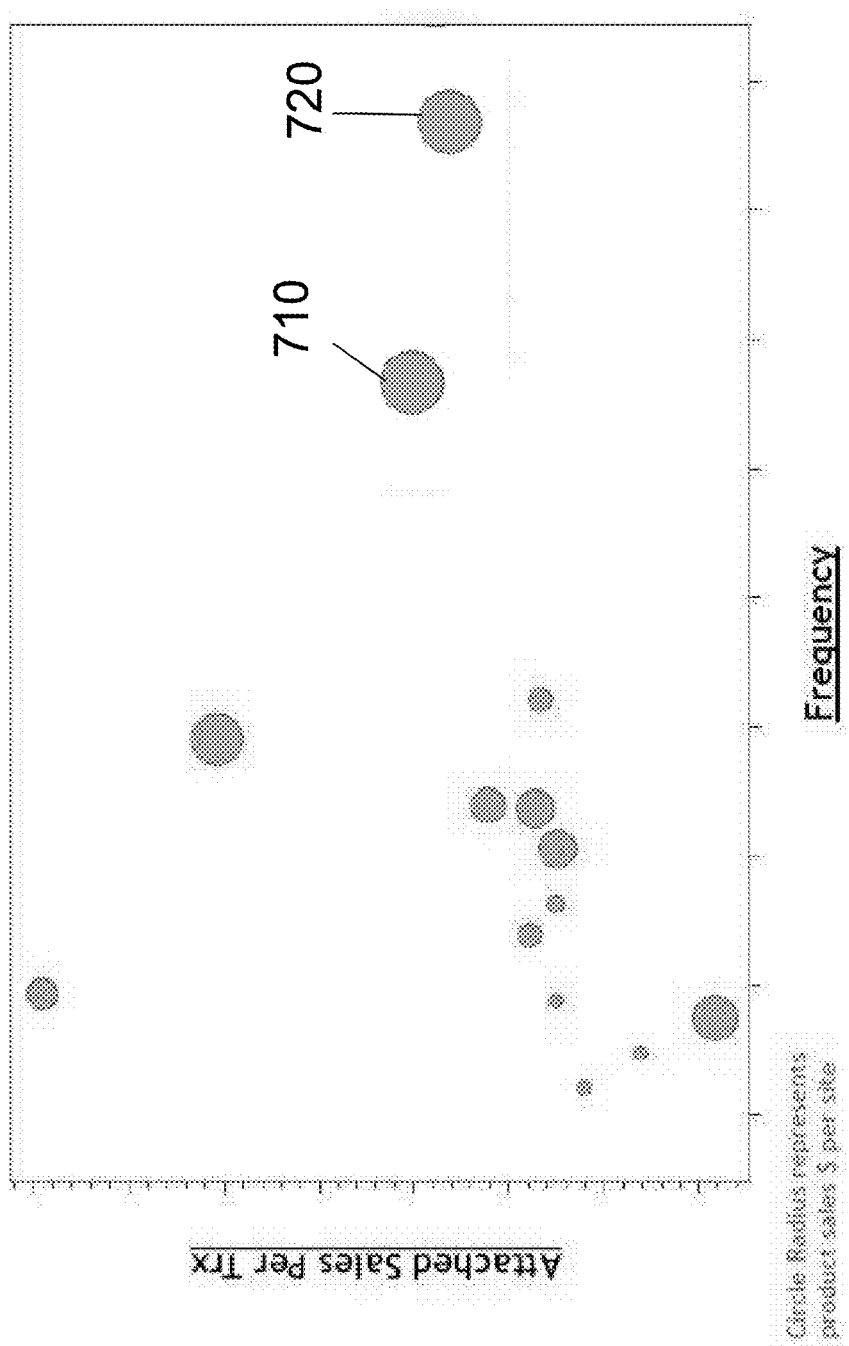
FIG. 7 shows a chart on a graphical user interface according to an exemplary embodiment.

The system can determine which categories of products should be featured on endcaps in the future. For example, some items that are high sellers on their own but have low attached sales may not actually be good candidates. Referring to FIG. 6, a chart is shown for rest of basket sales per transaction versus number of transactions per site, where the radius of a circle at a data point represents product sales per site. Data point 610 represents an item which is a high seller on its own, but attached sales are low. Referring to FIG. 7, a chart is shown for attached sales per transaction versus frequency, where the radius of a circle at a data point represents product sales per site. Data point 710 and data point 720 meet the success profile of high frequency and moderate attached sales.

Figure 8:
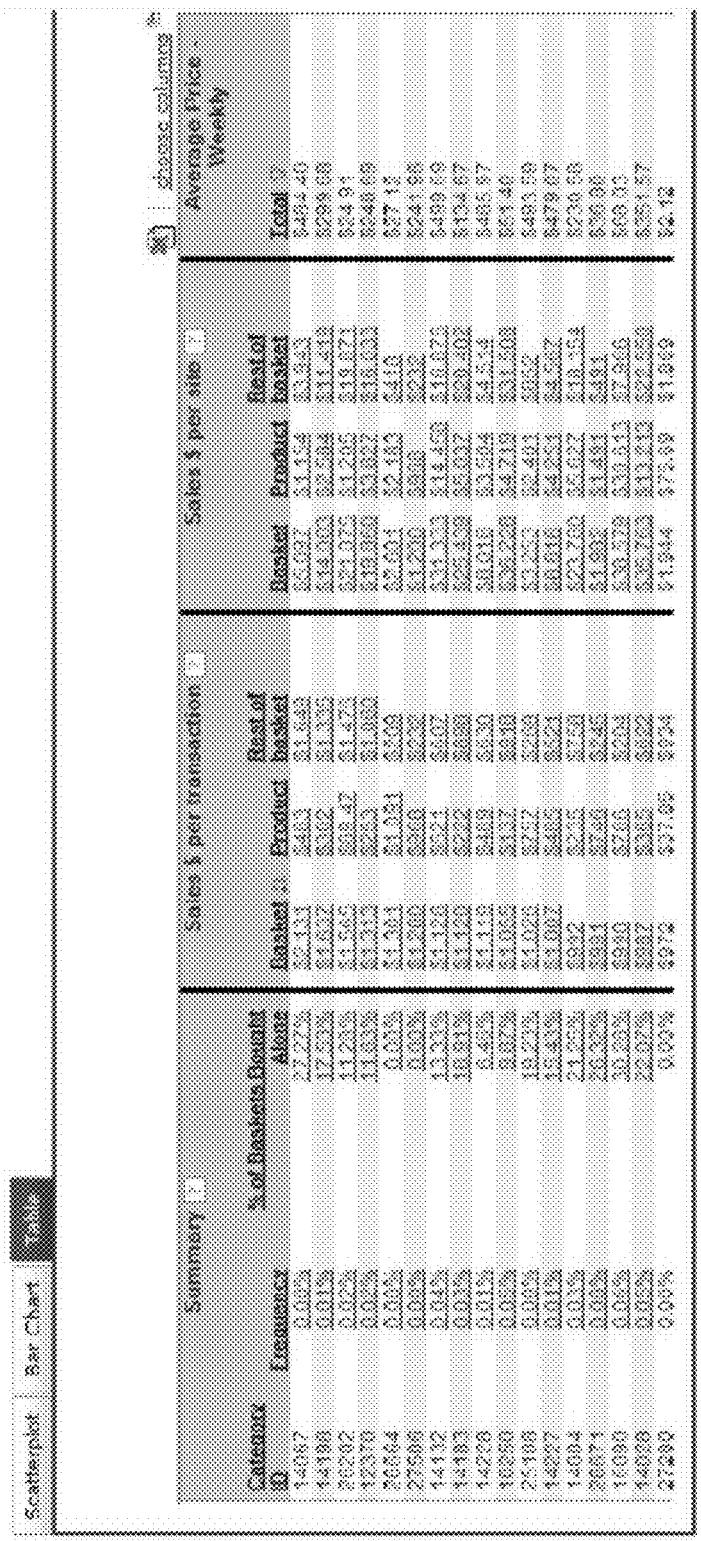
FIG. 8 shows a table on a graphical user interface according to an exemplary embodiment.

The system can present a graphical user interface, as shown in FIG. 8, which can provide information across categories. For example, for each category (identified with an identification number), the graphical user interface can present frequency of that category, percentage of baskets where the category was bought alone, basket sales per transaction, product sales per transaction, rest of basket sales per transaction, basket sales per site, product sales per site, rest of basket sales per site, and average price weekly. During evaluation, for any given category, the system can also assess which other categories have a high affinity to inform which categories should be featured together.

The functionality described herein can be implemented by numerous modules or components that can perform one or multiple functions. Each module or component can be executed by a computer, such as a server, having a non-transitory computer-readable medium and processor. In one alternative, multiple computers may be necessary to implement the functionality of one module or component.

Unless specifically stated otherwise as apparent from the following discussion, it is appreciated that throughout the description, discussions utilizing terms such as "processing" or "computing" or "calculating" or "determining" or "measuring" or "selecting" or "displaying" or "identifying" or "detecting" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

The exemplary embodiments described herein are described as software executed on at least one server, though it is understood that embodiments can be configured in other ways and retain functionality. The embodiments can be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

The embodiments described above are intended to be exemplary. One skilled in the art recognizes that there are numerous alternative components and embodiments that may be substituted for or included in the particular examples described herein and such additions or substitutions still fall within the scope of the invention.

What is claimed is:

1. A computer-implemented method comprising:
    generating, by a host server, a data set in a database comprising data received from at least one client computer over a network, the data set representing historical performance data for each of a plurality of items sold by at least one entity associated with the client computer;

generating, by the host server, a subset of the data set in the database to include only data representing transactions comprising a promoted item during a timeframe;

measuring, by the host server, a value representing an impact of a promoted item during the timeframe;

generating, by the host server, a file having a listing of affinity items based upon a determination of an attach rate of an item and a frequency of purchase of the item, wherein the listing is based upon a set of parameters having a threshold value for the attach rate or the frequency rate, and wherein the host server executes a filter that selects items for the listing of affinity items that satisfy the filter based on the set of parameters;

associating, by the host server, the listing of affinity items in the file with a record of the promoted item;

calculating, by the host server, a value representing an impact of the items in the listing of affinity items in the at least one transaction of the promoted item;

aggregating, by the host server, the impact of the promoted item with the impact of the at least one high affinity item to determine a total impact of the promotion;

identifying, by the host server, at least one cannibalized item based upon the promoted item;

measuring, by the host server, an impact of the at least one cannibalized item in at least one transaction of the promoted item;

identifying, by the host server, at least one item in the file having the listing of affinity items to the at least one cannibalized item; and measuring, by the host server, the impact of the at least one item in the file having the listing of affinity items to the at least one cannibalized item in at least one transaction of the cannibalized item; and generating, by the host server, a graphical user interface for presentation on the client computer that comprises a representation of the total impact of the promotion.

2. The method according to claim 1, wherein generating the file having the listing of affinity items comprises filtering the at least one item based upon whether an item of the at least one item is within a defined price range.

3. The method according to claim 1, wherein generating the file having the listing of affinity items comprises filtering the at least one item based upon whether an item of the at least one item has a sales volume above a threshold amount.

4. The method according to claim 1, wherein generating the file having the listing of affinity items comprises filtering the at least one item based upon whether an item of the at least one item has a sales frequency above a threshold amount.

5. The method according to claim 1, wherein aggregating comprises adding the impact of the promoted item to the impact of the at least one item in the listing of affinity items and subtracting the impact of the at least one cannibalized item and subtracting the impact of the at least one item in the listing of affinity items to the at least one cannibalized item to determine a total impact of the promotion.

6. A system comprising:
a database; and
a host server coupled to the database and comprising a processor configured to:
generate a data set in the database comprising data received from at least one client computer over a network, the data set representing historical performance data for each of a plurality of items sold by at least one entity associated with the client computer;

generate a subset of the data set in the data in the database to include only data representing transactions comprising a promoted item during a timeframe;

measure a value representing an impact of a promoted item during the timeframe;

generate a file having a listing of affinity items based upon a determination of an attach rate of an item and a frequency of purchase of an item, wherein the listing is based upon a set of parameters having a threshold value for the attach rate or the frequency rate, and wherein the host server executes a filter that selects items for the listing of affinity items that satisfy the filter based on the set of parameters;

associate the listing of affinity items in the file with a record of the promoted item;

calculate a value representing an impact of the items in the listing of affinity items in at least one transaction of the promoted item;

identify at least one cannibalized item based upon the promoted item;

calculate a value representing an impact of the at least one cannibalized item in at least one transaction of the promoted item;

identify at least one item in the listing of affinity items to the at least one cannibalized item;

calculate a value representing the impact of the at least one item in the listing of affinity items to the at least one cannibalized item in at least one transaction of the cannibalized item; and aggregate the impact of the promoted item, the impact of the at least one item in the listing of affinity items, the impact of the at least one cannibalized item, and the impact of the at least one item in the listing of affinity items to the at least one cannibalized item to determine a total impact of the promotion; and generate a graphical user interface for presentation on the client computer that comprises a representation of the total impact of the promotion, wherein the graphical user interface is configured to illustrate the plurality of items sold by the entity including the promoted item, each item of the plurality of items represented by a circle arranged based on the respective item's attach rate and a number of transactions comprising the respective item, wherein a radius of the circle corresponds to the item's overall sales volume for the entity.

7. The system according to claim 6, wherein the listing of affinity items comprises filtering the at least one item based upon whether an item of the at least one item is within a defined price range.

8. The system according to claim 6, wherein the listing of affinity items comprises filtering the at least one item based upon whether an item of the at least one item has a sales volume above a threshold amount.

9. The system according to claim 6, wherein the listing of affinity items comprises filtering the at least one item based upon whether an item of the at least one item has a sales frequency above a threshold amount.

10. The system according to claim 6, wherein the identification of at least one item with affinity to the cannibalized item comprises calculating a frequency and attach rate of the at least one item to the cannibalized item.

11. The system according to claim 6, wherein the processor is further configured to select the at least one affinity item based upon those items having an affinity to the cannibalized item above a threshold amount.

12. The system according to claim 6, wherein the identification of at least one item with affinity to the cannibalized item comprises filtering at least one item based on frequency of purchase of the one item.

13. The system according to claim 6, wherein the identification of at least one item affinity to the promoted item comprises filtering at least one item based on the level of attachment of the at least one item to the cannibalized item.

14. The system according to claim 6, wherein the identification of at least one item with affinity to the cannibalized item comprises filtering the at least one item based upon whether an item of the at least one item is within a defined price range.

15. The system according to claim 6, wherein the identification of at least one item with affinity to the cannibalized item comprises filtering the at least one item based upon whether an item of the at least one item has a sales volume above a threshold amount.

16. The system according to claim 6, wherein the identification of at least one item with affinity to the cannibalized item comprises filtering the at least one item based upon whether an item of the at least one item has a sales frequency above a threshold amount.

17. The system according to claim 6, wherein the aggregation comprises adding the impact of the promoted item to the impact of the at least one high affinity item and subtracting the impact of the at least one cannibalized item and subtracting the impact of the at least one item with affinity to the at least one cannibalized item to determine the total impact of the promotion.

18. A computer-implemented method comprising:
identifying, by a host server, from a set of data in a database representing transactions within a time period a subset of the set of transactions where a transaction included a promoted item;
calculating, by the host server, an impact of the promoted item in the subset of the set of transactions;
identifying, by the host server, at least one item of the plurality of items that has an affinity above a threshold amount to the promoted item;
calculating, by the host server, an impact of the at least one item having an affinity to the promoted item above a threshold amount in the subset of the set of transactions;
calculating, by the host server, a total impact based upon the impact of the promoted item and the impact of the at least one item having an affinity to the promoted item above a threshold amount in the subset of the set of transactions;
identifying, by the host server, at least one item of the plurality of items that is cannibalized based upon the promoted item;
calculating, by the host server, an impact of the at least one cannibalized item the subset of the set of transactions;
identifying, by the host server, at least one item of the plurality of items that has an affinity above a threshold amount to the at least one cannibalized item; and
calculating, by the host server, an impact of the at least one item of the plurality of items that has an affinity above a threshold amount to the at least one cannibalized item; and
generating, by the host server, a record representing a profile quantifying success of a promotion based upon the calculation of the total impact.

19. The method according to claim 18, wherein aggregating comprises adding the impact of the promoted item to the impact of the at least one item having an affinity to the promoted item above a threshold amount in the subset of the set of transactions, subtracting the impact of the at least one cannibalized item the subset of the set of transactions, and subtracting the impact of the at least one item of the plurality of items that has an affinity above a threshold amount to the at least one cannibalized item.

* * * * *